United States Patent
Jung (10) Patent No.: US 8,155,643 B2
(45) Date of Patent: *Apr. 10, 2012

(54) MOBILE TERMINAL AND SYSTEM SCAN METHOD THEREOF

(75) Inventor: Hyo Jin Jung, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 569 days.

This patent is subject to a terminal disclaimer.

(21) Appl. No.: 12/203,362

(22) Filed: Sep. 3, 2008

(65) Prior Publication Data

US 2009/0075650 A1    Mar. 19, 2009

(30) Foreign Application Priority Data

Sep. 13, 2007   (KR) .................... 10-2007-0092908

(51) Int. Cl.
*H04W 4/00*   (2009.01)
(52) U.S. Cl. ............... 455/432.1; 455/432.2; 455/435.2; 455/436; 455/574; 370/331; 370/338
(58) Field of Classification Search ............... 455/432.1, 455/436, 443, 557; 370/328, 331, 338, 311
See application file for complete search history.

(56) References Cited

U.S. PATENT DOCUMENTS

| | | | |
|---|---|---|---|
| 5,781,543 A | 7/1998 | Ault et al. | |
| 7,564,810 B2* | 7/2009 | Hernandez et al. | 370/311 |
| 7,801,066 B2* | 9/2010 | Wang et al. | 370/311 |
| 2002/0082010 A1* | 6/2002 | Koorapaty et al. | 455/434 |
| 2004/0152464 A1* | 8/2004 | Sugaya | 455/435.1 |
| 2005/0281234 A1* | 12/2005 | Kawamura et al. | 370/338 |
| 2006/0270438 A1* | 11/2006 | Choi | 455/522 |
| 2007/0159992 A1* | 7/2007 | Kim | 370/311 |
| 2008/0037469 A1* | 2/2008 | Hamilton et al. | 370/331 |
| 2008/0111712 A1* | 5/2008 | Himpe | 341/26 |

FOREIGN PATENT DOCUMENTS

WO    01/47142 A1    6/2001

* cited by examiner

*Primary Examiner* — Kent Chang
*Assistant Examiner* — Magdi Elhag
(74) *Attorney, Agent, or Firm* — Jefferson IP Law, LLP (57) ABSTRACT

A mobile terminal and system scan method thereof is provided for effectively acquiring system information. The system scanning method includes performing a first scanning process on entire channels registered to a Preferred Roaming List (PRL) for acquiring system information, calculating, when the system information is not acquired in the first scanning process, a power saving time and a second scan time on the basis of a first scan time taken for the first scanning process, the second scan time being equal to the first scan time, and performing a second scanning process and a power saving process, on the basis of the power saving time and the second scan time, alternately until the system information is acquired.

23 Claims, 6 Drawing Sheets

MOBILE TERMINAL AND SYSTEM SCAN METHOD THEREOF

PRIORITY

This application claims the benefit under 35 U.S.C. §119 (a) of a Korean patent application filed in the Korean Intellectual Property Office on Sep. 13, 2007 and assigned Serial No. 2007-0092908, the entire disclosure of which is hereby incorporated by reference.

BACKGROUND OF THE INVENTION

1. Field of the Invention

The present invention relates to a mobile communication system. More particularly, the present invention relates to a mobile terminal and system scan method thereof that is capable of effectively acquiring system information.

2. Description of the Related Art

In a cellular mobile communication system, a mobile terminal selects a base station by which it is served and receives system information from the selected base station. The mobile terminal provides the base station with its location and registration information using the system information such that the base station can serve the mobile terminal. When the system information is acquired, the mobile terminal registers the acquired system information (hereinafter referred to as "channel") to a Most Recently Used (MRU) list.

Here, the term "system" denotes a mobile communication system, provided by a specific mobile operator, including analog and digital cellular system and Personal Communication Service (PCS) system.

In the meantime, when a mobile terminal loses connection with the system, it performs system scan according to preset system scan conditions. According to the system scan conditions, the mobile terminal operates in a scan mode or a power saving process. The scan mode and power saving process are alternating. In order to acquire the system information, the mobile terminal scans the systems registered to the MRU list in priority order and then scans channels listed in a Preferred Roaming List (PRL) provided by the mobile operator in priority order of preference.

In a case that a number of the channels listed in the PRL, the operation mode of the mobile terminal is likely to be transitioned to the power saving process before the mobile terminal completes scanning all the channels in the scan mode, thereby elongating the time it takes to acquire the system information. Also, the conventional system scan method has a drawback in that it takes a long time to acquire the system information especially in a weak electrical field below −100 dB since most of the channels listed in the PRL are scanned in a micro-scan mode, whereas a small number of channels are scanned in a full-scan mode.

Therefore, a need exists for an improved system scan method and a terminal having the same, which is capable of effectively acquiring system information.

SUMMARY OF THE INVENTION

An aspect of the present invention is to address at least the above-mentioned problems and/or disadvantages and to provide at least the advantages described below. Accordingly, an aspect of the present invention is to provide a mobile terminal and system scan method thereof that is capable of reducing system information acquisition latency.

An aspect of the present invention is to provide a mobile terminal and system scan method thereof that is capable of effectively acquiring system information.

Another aspect of the present invention is to provide a mobile terminal and system scan method thereof that is capable of improving system information acquisition performance even in weak electrical field area.

In accordance with an exemplary embodiment of the present invention, a system scanning method for a mobile terminal is provided. The method includes performing a first scanning process on entire channels registered to a Preferred Roaming List (PRL) for acquiring system information, calculating, when the system information is not acquired in the first scanning process, a power saving time and a second scan time on the basis of a first scan time taken for the first scanning process, the second scan time being equal to the first scan time, and performing a second scanning process and a power saving process, on the basis of the power saving time and the second scan time, alternately until the system information is acquired.

In accordance with another exemplary embodiment of the present invention, a system scanning method for a mobile terminal is provided. The method includes performing a scanning process including a Preferred Roaming List (PRL) full-scan for scanning entire channel registered to the PRL, and performing, when system information is not acquired in the first scanning process, a power saving process during a power saving time, wherein the scanning process and power saving process are alternately performed until the system information is acquired.

In accordance with yet another exemplary embodiment of the present invention, a mobile terminal is provided. The terminal includes a first scanner for performing a first scan process including a full-scan on entire channels registered to a Preferred Roaming List (PRL), a scanning conditioner for calculating, when system information is not acquired by the first scanner, a power saving time on the basis of a first scan time taken for a first scanning process and setting a second scan time equal to the first scan time, and a second scanner for performing a power saving process during the power saving time and a second scanning process during the second scan time alternately until the system information is acquired.

In accordance with still another exemplary embodiment of the present invention, a mobile terminal is provided. The terminal includes a scanner for performing a scanning process including a full-scan on entire channel registered to a Preferred Roaming List (PRL), and a power controller for performing, when the scanner fails to acquire system information, a power saving process, wherein the scanner and the power controller perform the scanning process and power saving process alternately until the system information is acquired.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In a system scan method of an exemplary embodiment of the present invention, the mobile terminal can scan channels having a Received Signal Strength Indicator (RSSI) value equal to or greater than −105 dB in a full-scan mode and equal to or greater than −100 dB in a micro-scan mode.

Figure 1:
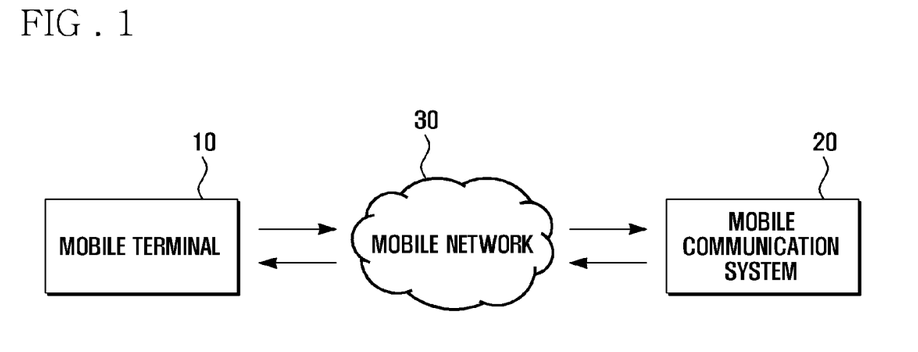
FIG. 1 is a schematic diagram illustrating a communication environment for implementing a system scan method according to an exemplary embodiment of the present invention.

FIG. 1 is a schematic diagram illustrating a communication environment for implementing a system scan method according to an exemplary embodiment of the present invention.

Referring to FIG. 1, a mobile terminal 10 is connected to a mobile communication system 20 via a communication network 30.

The mobile communication system 20 includes a plurality of cells defined by a radio coverage area of respective base stations that are controlled by a Mobile Switching Center (MSC), such that the mobile terminal 10 can maintain connection to a service while roaming across the cells.

The mobile terminal 10 establishes a connection to the mobile communication system 20 to acquire system information and informs the mobile communication system 20 of its location and registration to receive a communication service.

If the mobile terminal 10 loses the system due to disconnection with a base station, it performs the system scan to find the mobile communication system 20.

Figure 2:
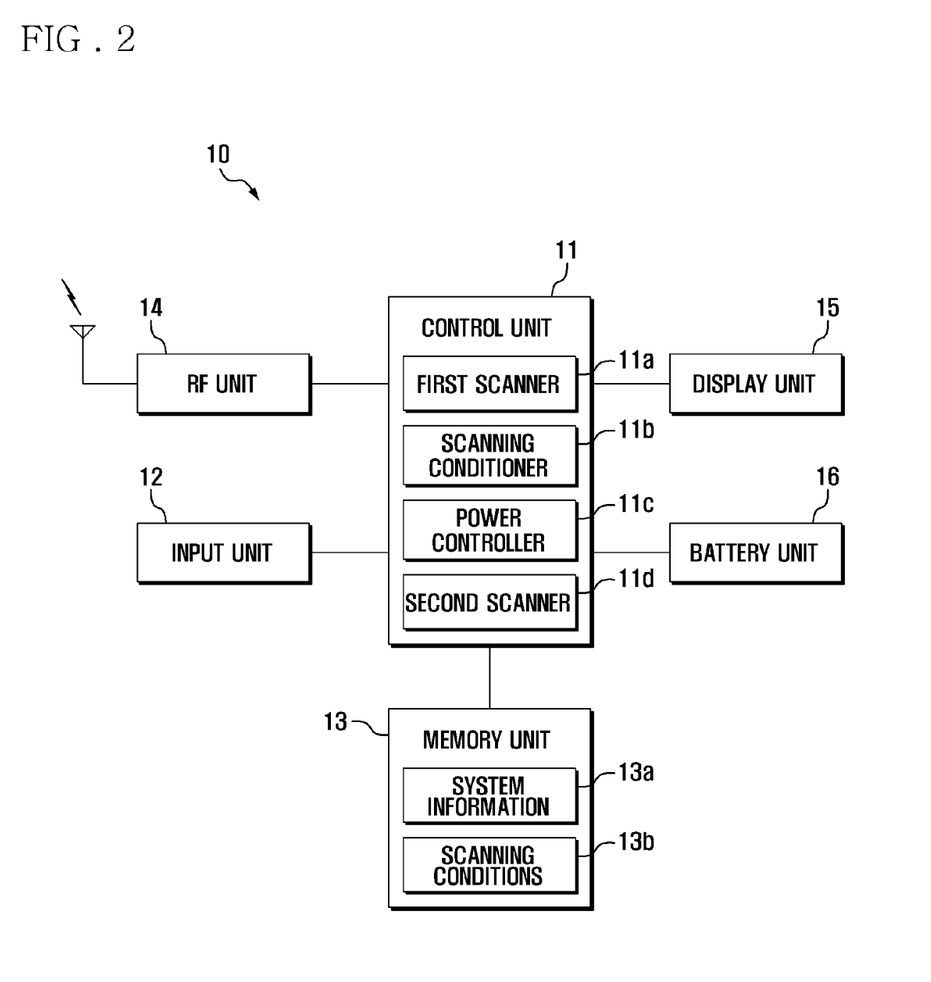
FIG. 2 is a block diagram illustrating a configuration of a mobile terminal according to an exemplary embodiment of the present invention.

FIG. 2 is a block diagram illustrating a configuration of a mobile terminal according to an exemplary embodiment of the present invention.

Referring to FIG. 2, the mobile terminal 10 includes a control unit 11, an input unit 12, a memory unit 13, a Radio Frequency (RF) unit 14, a display unit 15, and a battery unit 16.

The control unit 11 is a microprocessor for controlling general operations of the mobile terminal 10. The control unit 11 performs a system scan to establish a connection to the mobile communication system and determines scanning conditions on the basis of the result of the initial system scan. The system scan is initiated when the mobile terminal 10 is turned on and loses the system after acquiring the system information.

The input unit 12 is provided with a plurality of keys for generating a key signal in response to a key input by a user and transmits the key signal to the control unit 11. The input unit 12 may be implemented with at least one of a keypad, a pointing device such as a touchpad, and a touchscreen.

The memory unit 13 stores application programs associated with the operations of the mobile terminal and application data generated while the application programs are executed. More particularly, in this exemplary embodiment, the memory unit 13 stores the scanning application program for performing the system scan and determines the scanning conditions based on the result of the system scan. The memory unit 13 also stores the system information 13a received from the mobile communication system 20 and the scanning conditions 13b.

The RF unit 14 is responsible for radio communication of the mobile terminal with the mobile communication system 20. That is, the RF unit 14 establishes a connection with the mobile communication system 20 and enables the mobile terminal 10 to receive the system information from the mobile communication system 20. More particularly, when the mobile terminal 10 loses the system, the RF unit 14 performs the system scan for finding the mobile communication system according to the scanning conditions.

The display unit 15 displays various menus associated with the functions provided by the mobile terminal and data retrieved from the memory unit 13. The display unit 15 may be implemented with a Liquid Crystal Display (LCD) or a touchscreen-enabled LCD. In a case that the display unit 15 is implemented with the touchscreen-enabled LCD, it may be used as an input unit as well as a display unit.

The battery means 16 supplies power to the internal units of the mobile terminal 10.

The control unit 11 includes a first scanner 11a, a second scanner 11d, a scanning conditioner 11b, and a power controller 11c. The first scanner 11a performs a full-scan on the entire channels of the PRL. If the first scanner 11a fails system acquisition, the scanning conditioner 11b calculates a power saving time (D) on the basis of the first scan time (S1) taken for the first scan and sets a second scan time (S2) identical with the first scan time (S1). The power controller 11c turns off the power during the power saving time (D) after the first scan process. When the power saving time (D) has expired, the second scanner 11d performs a second scan process. At this time, the power controller 11c and the second scanner 11d operate alternately until the system information is acquired.

Although the first scanner 11a and the second scanner 11d are separately depicted in FIG. 2, they can be implemented as a single scanner which performs both the first and second scan processes.

In order to acquire the system information, the first scanner 11a performs a MRU full-scan on the most recently used channels registered to the MRU list and a PRL micro-scan on the channels registered to the PRL, sequentially. The first scan time (S1) is equal to the sum of the MRU full-scan time, PRL micro-scan time, and PRL full-scan time.

The operation of the first scanner 11a is described hereinafter in more detail.

First, the first scanner 11a performs the MRU full-scan for system acquisition. If a home system has not been found or a roamed system has been found during the MRU full-scan, the first scanner 11a performs the PRL micro-scan. In contrast, if the home system has been found, the first scanner 11a stops the first scan process immediately and acquires the system information from the home system.

Also, when no system has been found during the MRU full-scan, the first scanner 11a performs the PRL micro-scan. If the home system has not been found or a roamed system has found during the PRL micro-scan, the first scanner 11a performs the PRL full-scan. If the home system has been found in the PRL full-scan, the first scanner 11a stops the first scan process immediately and acquires the system information from the home system.

Meanwhile, if a roamed system has been found in PRL micro-scan, the first scanner 11a searches for the home system in the PRL full-scan. If the home system has not been found in the PRL full-scan, the first scanner 11a ends the first scan and acquires the system information from the roamed system. In contrast, if the home system has been found in the PRL full-scan, the first scanner 11a ends the first scan process and acquires the system information from the home system.

Also, when the system acquisition has failed even in the PRL micro-scan process, the first scanner 11a performs the PRL full-scan. If a system has been found in the PRL full-scan, the first scanner 11a stops the first scan process immediately and acquires the system information from the system. At this time, the system can be the home system or a roamed system. If the system acquisition has failed even in the PRL full-scan, the first scanner 11a ends the first scan process, such that the scanning conditions are determined by the scanning conditioner 11b.

During the first scan process, the first scanner 11a attempts the system acquisition with the home system. If it has failed to find the home system, the first scanner 11a attempts the system acquisition with a roamed system. Although a roamed system has been found in the MRU full-scan or PRL micro-scan, the first scanner 11a attempts to find the home system in the PRL full-scan. If the system acquisition has failed in the first scan process, the scanning conditioner 11b generates or updates the scanning conditions.

The scanning conditioner 11b calculates the first scan time S1 and a compensation value R by dividing the first scan time S1 with a first constant C1. The scanning conditioner 11b calculates the power saving time D by multiplying the compensation value R with a second constant C2. Next, the scanning conditioner 11b calculates the second scan time S2 by multiplying the compensation value R with the first constant C1. That is, the scanning conditioner 11b determines the first and second scan times S1 and S2.

The first and second constants C1 and C2 indicate the scanning time and power saving time set to default values, and the compensation value R acts as a weight applied to the scanning time and power saving times. The first constant C1 may be set to a value corresponding to the previously used scanning time, and the second constant C2 may be set to a value corresponding to the previously used power saving time. For example, the first and second constants C1 and C1 may be set to 5 and 36, respectively. With these constants, if the measured first scan time S1 is 30 seconds, the compensation value R is 6. In this case, the power saving time D becomes 216 seconds (36 seconds×6=216), and the second time S2 increases 6 times from 5 seconds to 30 seconds which is equal to the first scan time S1. Since the scanning time increases from 5 seconds to 30 seconds with the first constant C1, the power saving time D output by the scanning conditioner 11b becomes 216 seconds (36 seconds×6) with the second constant C2.

The power controller 11c controls such that the mobile terminal operates in the power saving mode during the power saving time D. The second scanner 11d starts the second scanning process when the power saving time D has expired. In the second scanning process, the second scanner 11d performs the MRU full-scan, PRL micro-scan, and PRL full-scan as in the first scanning process until the second scan time (S2) expires.

If the second scan time S2 has expired with acquiring the system, the power controller 11c performs the power saving process. The power controller 11c and the second scanner 11d operate alternately until the system acquisition succeeds.

In this exemplary embodiment, since the mobile terminal 10 performs the MRU full-scan, PLR micro-scan, and PLR full-scan in series during the first and second scanning processes, it may acquire the system information quickly even in the weak electrical field area.

Although a roamed system is found in the MRU full-scan or PRL micro-scan, the mobile terminal searches for the home system through the PRL full-scan. This is because the use of the home system is advantageous in view of communication cost and quality in comparison with the roamed system.

In this exemplary embodiment, since the power saving time D and the second scan time S2 are adjusted on the basis of the first scan time S1, the system acquisition can be effectively performed.

The system scanning method of the mobile terminal 10 is described hereinafter in more detail with reference to FIGS. 1 to 8.

Figure 3:
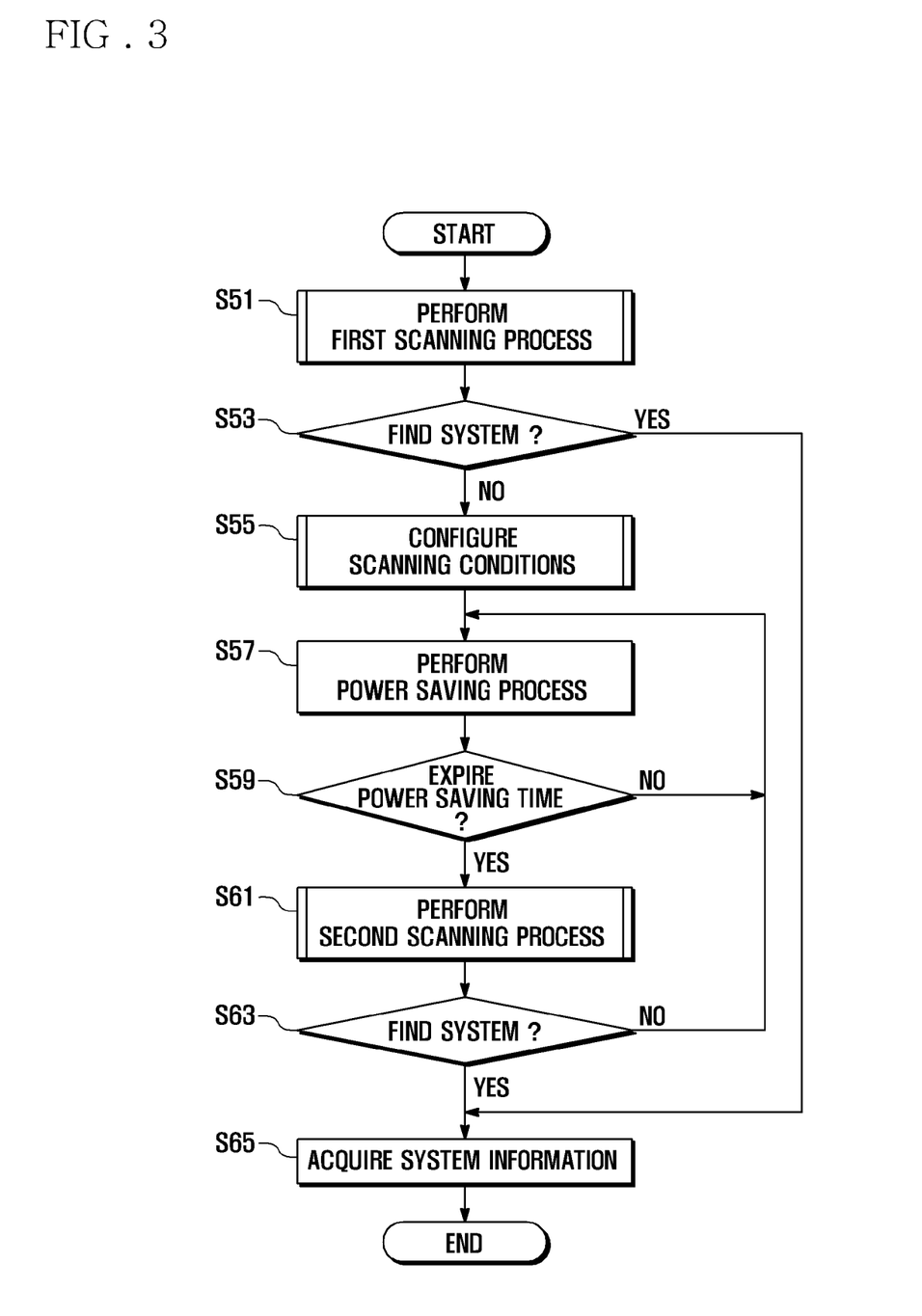
FIG. 3 is a flowchart illustrating a system scanning method of a mobile terminal according to an exemplary embodiment of the present invention.

FIG. 3 is a flowchart illustrating a system scanning method of a mobile terminal according to an exemplary embodiment of the present invention. With the following description on the system scanning method, the structures and functions of the above structured mobile terminal are more clarified.

Referring to FIGS. 1 to 3, the mobile terminal 10 starts the first scanning process in step S51. When the mobile terminal 10 is turned on or loses the acquired system, the mobile terminal performs first scanning process.

Figure 4:
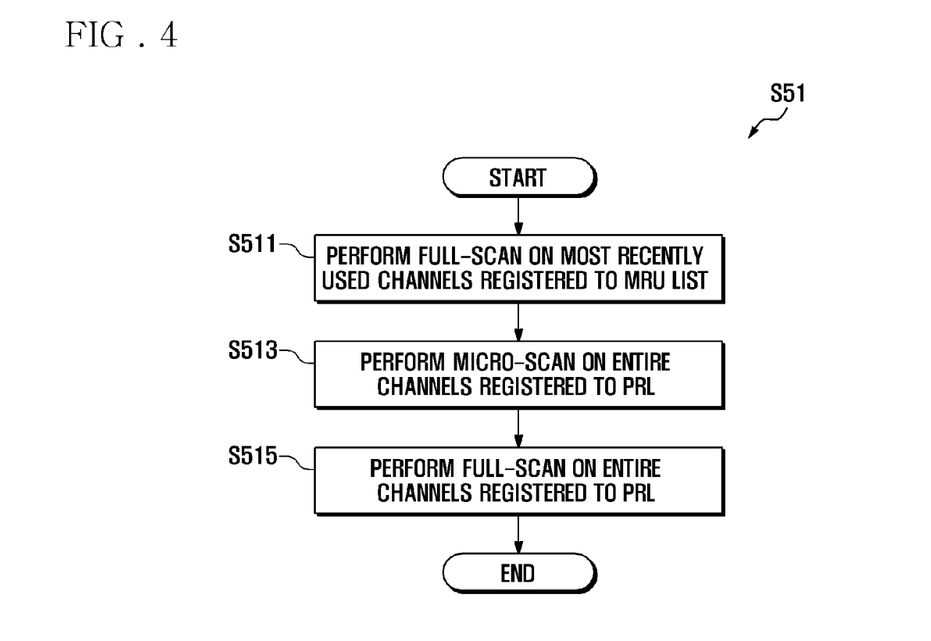
FIG. 4 is a flowchart illustrating a first scanning process according to an exemplary embodiment of the present invention.

FIG. 4 is a flowchart illustrating a first scanning process according to an exemplary embodiment of the present invention.

Referring to FIG. 4, in order to acquire the system information, the first scanner 11a of the mobile terminal 10 performs a MRU full-scan with reference to the MRU list listing the most recently used channels in step S511. The first scanner 11a performs a PRL micro-scan on all channels listed in the PRL in step S513, and a PRL full-scan on all channels listed in the PRL in step S515 in series.

Referring again to FIG. 3, after the first scanning process ends, the mobile terminal 10 determines whether a system has been found in step S53. If a system has been found, the mobile terminal 10 acquires system information 13a from the system in step S65 and stores the system information 13a in the memory unit 13. Otherwise, if no system has been found in step S53, the mobile terminal 10 determines scanning conditions on the basis of a first scan time S1 measured by the scanning conditioner 11b in step S55.

Figure 5:
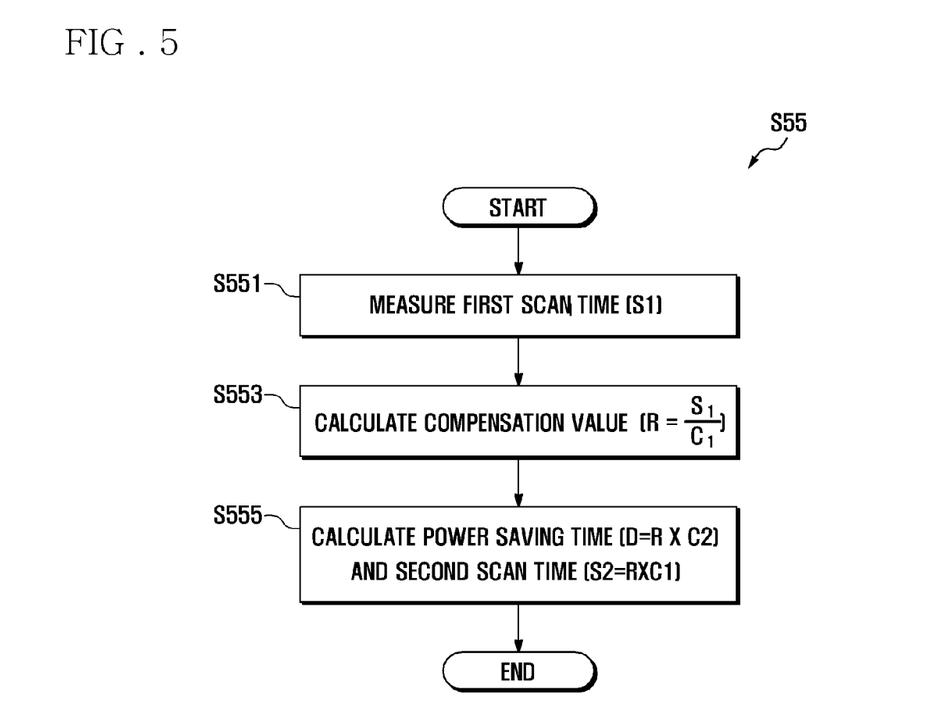
FIG. 5 is a flowchart illustrating a scanning condition determination process according to an exemplary embodiment of the present invention.

FIG. 5 is a flowchart illustrating a scanning condition determination process according to an exemplary embodiment of the present invention.

Referring to FIG. 5, in the scanning condition determination process of step S55, the scanning conditioner 11b measures the first scan time S1 in step S551, and calculates a compensation value R by dividing the first scan time S1 by a first constant C1 in step S553. Then the scanning conditioner 11b calculates the power saving time D by multiplying a second constant C2 by the compensation value R and a second scan time S2 by multiplying the first constant C1 by the compensation value R in step S555. That is, the scanning conditioner 11b sets the second scan time S2 equal to the first scan time S1. The scanning conditions are stored within the memory unit 13.

Referring again to FIG. 3, after the scanning conditions are determined, the mobile terminal 10 enters the power saving process in step S57 and determines whether the power saving time D has expired in step S59. If the power saving time D has not expired, the mobile terminal 100 maintains the power saving process in step S57. In contrast, if the power saving time D has expired in step S59, the mobile terminal 10 starts the second scanning process in step S61.

Figure 6:
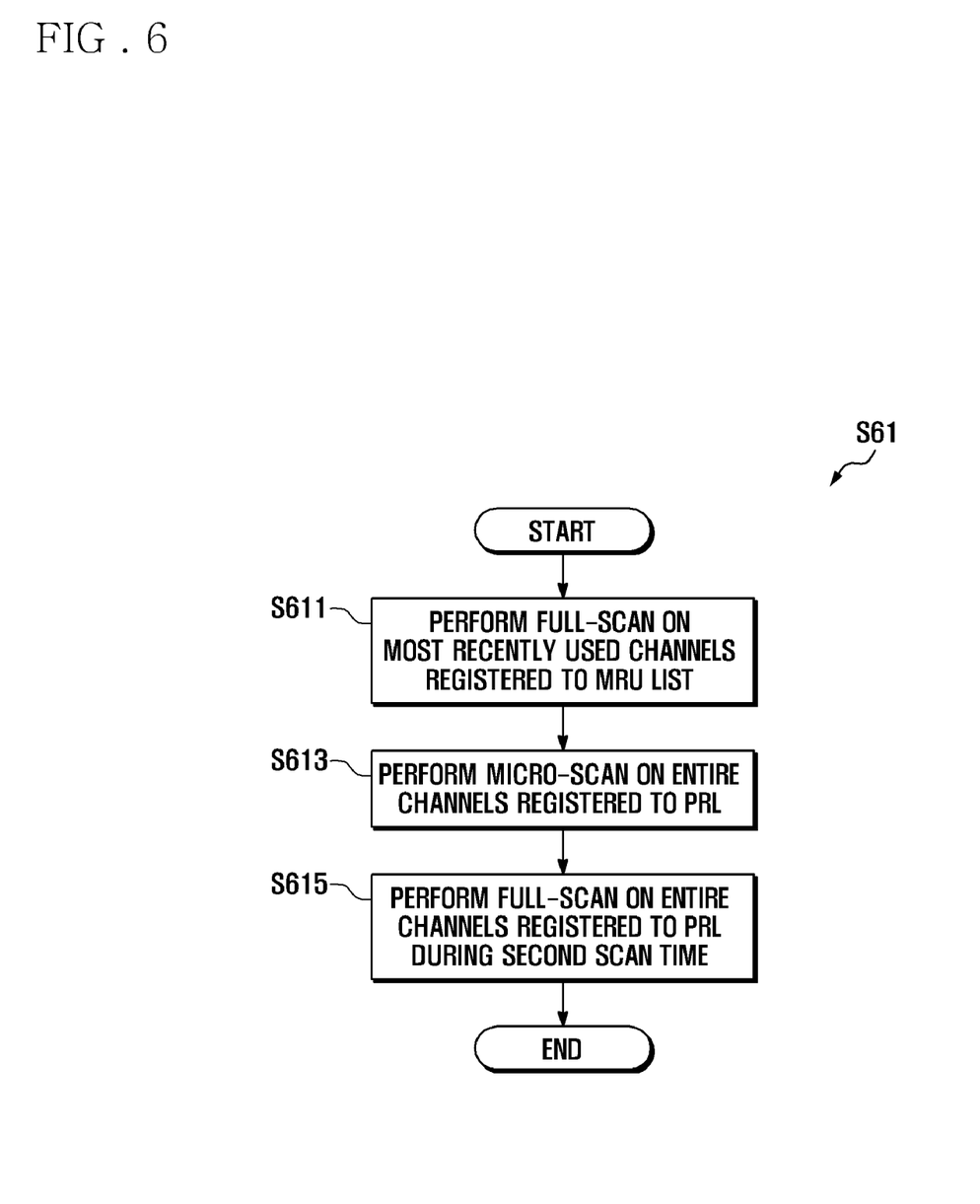
FIG. 6 is a flowchart illustrating a second scanning process according to an exemplary embodiment of the present invention.

FIG. 6 is a flowchart illustrating a second scanning process according to an exemplary embodiment of the present invention.

Referring to FIG. 6, in the second scanning process, the second scanner 11d of the mobile terminal 10 performs the MRU full-scan with reference to the MRU list listing the most recently used channels in step S611, the PRL micro-scan on the entire channels listed in the PRL in step S613. Then the second scanner 11d performs the PRL full-scan on the entire channels listed in the PRL in step S615 in series. The second scanner 11d performs the PRL full-scan until the second scan time S2 expires.

Referring again to FIG. 3, the mobile terminal determines whether a system has been found in step S63. If a system has been found, the mobile terminal 10 acquires system information 13a from the system and stores the system information 13a in the memory unit 13 in step S65. In contrast, if no system has been found, the mobile terminal 10 returns to step S57. That is, when the system acquisition has failed in the first scanning process, the mobile terminal 10 repeats the power saving process and second scanning process alternately until the system acquisition succeeds.

Figure 7:
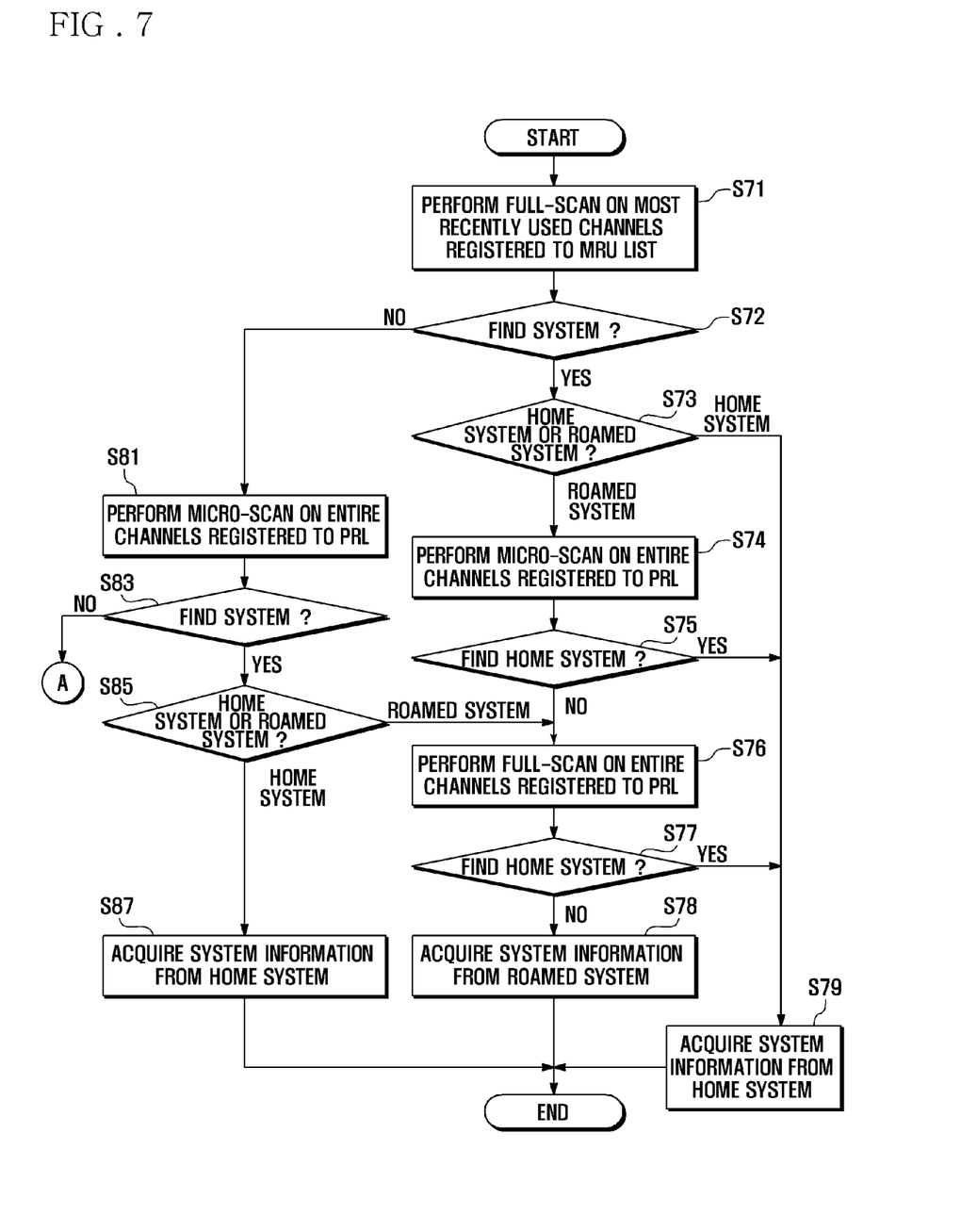
FIGS. 7 and 8 are flowcharts illustrating a system scanning process of a system scanning method according to an exemplary embodiment of the present invention.
Figure 8:
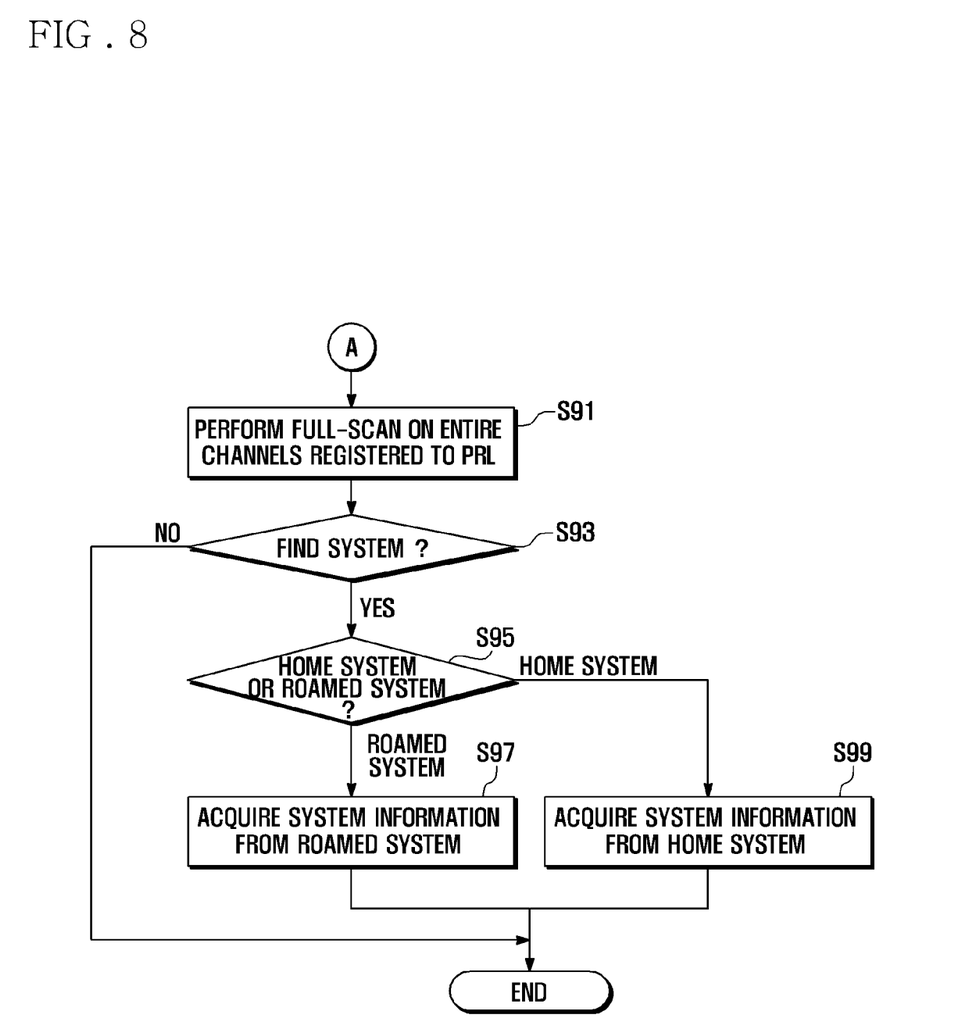

FIGS. 7 and 8 are flowcharts illustrating a system scanning process of a system scanning method according to an exemplary embodiment of the present invention. Since the first and second scanning processes are performed in the same manner, the first scanning process is described representatively.

Referring to FIGS. 7 and 8, the mobile terminal 10 performs an MRU full-scan for finding a system by means of the first scanner 11a in step S71 and determines whether a system is found while the first scanner 11a is performing the MRU full-scan in step S72.

If a system is found, the mobile terminal 10 determines whether the system is the home system or a roamed system in step S73.

If the system is the home system, the mobile terminal 10 stops the MRU full-scan immediately and acquires system information from the home system in step S79.

In contrast, if the system is a roamed system, the mobile terminal 10 performs a PRL micro-scan for finding the home system by means of the first scanner in step S74 and determines whether of home system is found while performing the PRL micro-scan in step S75. If the home system is found, the mobile terminal 10 stops the PRL micro-scan immediately and acquires system information from the home system in step S79. That is, when the home system and at least one roamed system are found, preferably, the mobile terminal 10 acquires the system information from home system.

If the home system is not found at step S75, the mobile terminal 10 performs the PRL full-scan by means of the first scanner in step S76 and determines whether the home system is found while the first scanner is performing the PRL full-scan in step S77. If the home system is found, the mobile terminal stops the PRL full-scan immediately and acquires the system information from the home system in step S79. In contrast, if the home system is not found even in the PRL full-scan, the mobile terminal 10 ends the first scanning process and acquires the system information from the roamed system found in the MRU full-scan in step S78.

Meanwhile, if no system is found in the MRU full-scan in step S72, the mobile terminal 10 performs PRL micro-scan in step S81 and determines whether a system is found while performing the PRL micro-scan in step S83. If a system is found, the mobile terminal 10 determines whether the system is the home system or a roamed system in step S85.

If the system is a roamed system, the mobile terminal 10 performs the PRL full-scan by means of the first scanner 11a at step S76. In contrast, if the system is the home system, the mobile terminal 10 acquires the system information from the home system in step S87.

Meanwhile, if no system is found in the PRL micro-scan in step S83, the mobile terminal 10 performs the PRL full-scan in step S91 and determines whether a system is found while performing the PRL full-scan in step S93. If a system is found, the mobile terminal 10 determines whether the system is the home system or a roamed system in step S95.

If the system is a roamed system, the mobile terminal 10 ends the first scanning process and acquires the system information from the roamed system in step S97. Otherwise, if the system is the home system, the mobile terminal 10 acquires the system information from the home system in step S99.

Meanwhile, if no system is found even in the PRL full-scan in S93, the mobile terminal ends the first scanning process and configures the scanning conditions by means of the scanning conditioner 11b such that the second scanner 11d performs the second scanning process with the scanning conditions configured by the scanning conditioner 11b. If no system is found even in the second scanning process, the mobile terminal 10 performs a power saving process by means of the power controller 11c.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the system scanning method of exemplary embodiments of the present invention enables the mobile terminal to perform a MRU full-scan, a PRL micro-scan, and a PRL full-scan in series, thereby acquiring the system information quickly. Even when a roamed system is found in the MRU full-scan or the PRL micro-scan, the mobile terminal performs the PRL full-scan for finding the home system.

In the system scanning method of exemplary embodiments of the present invention, the second scan time is adjusted on the basis of the first scan time taken for finding the system, it is possible to effectively acquire the system information.

Also, the system scanning method of exemplary embodiments of the present invention allows the mobile terminal to perform the PRL full-scan, the mobile terminal is likely to acquire the system information even in a weak electrical field area.

What is claimed is:

1. A system scanning method for a mobile terminal, the method comprising:
    performing a first scanning process on all channels registered to a Preferred Roaming List (PRL) to acquire system information;
    calculating, when the system information is not acquired in the first scanning process, a power saving time and a second scan time on the basis of a first scan time taken for the first scanning process, wherein the second scan time is equal to the first scan time; and
    performing a second scanning process and a power saving process, on the basis of the power saving time and the second scan time, alternately until the system information is acquired.

2. The method of claim 1, wherein the first scanning process comprises:
    performing a Most Recently Used (MRU) full-scan for scanning MRU channels;
    performing a PRL micro-scan for micro-scanning the channels registered to the PRL; and
    performing a PRL full-scan for full-scanning the channels registered to the PRL.

3. The method of claim 1, wherein the performing of the first scanning process comprises acquiring the system information from a home system if the home system is found during at least one of a Most Recently Used (MRU) full-scan, a PRL micro-scan, and a PRL full-scan.

4. The method of claim 3, wherein the performing of the first scanning process comprises acquiring the system information from a roaming system if the home system is not found during at least one of the MRU full-scan, the PRL micro-scan, and the PRL full-scan.

5. The method of claim 2, wherein the first scan time is equal to a sum of times taken for performing the MRU full-scan, the PRL micro-scan, and the PRL full-scan.

6. The method of claim 5, wherein the power saving time is obtained by multiplying a compensation value by a second constant, wherein the compensation value is obtained by dividing the first scan time by a first constant.

7. The method of claim 6, wherein the performing of the second scanning process and the power saving process comprises performing the MRU full-scan, the PRL micro-scan, and the PRL full-scan in series, after the power saving time expires, until the system information is acquired.

8. The method of claim 6, wherein the first constant is set to 5, and the second constant is set to 36.

9. The method of claim 1, wherein the performing of the first scanning process is initiated when the mobile terminal is turned on or loses the system after acquiring the system information.

10. A system scanning method for a mobile terminal, the method comprising:
    performing one or more iterations of a scanning process including a Preferred Roaming List (PRL) full-scan for scanning all channels registered to the PRL; and
    performing one or more iterations of a power saving process, wherein each iteration of the power saving process is performed during a power saving time after system information is not acquired in in a preceding iteration of a first scanning process,
    wherein, when the system information is not acquired in an initial iteration of the scanning process, an iteration of the scanning process and power saving process are alternately performed until the system information is acquired, and
    wherein, when the system information is not acquired in the initial iteration of the scanning process, a power saving time and a second scan time to perform subsequent iterations of the scanning process are calculated on the basis of a first scan time to perform the initial iteration of the scanning process, wherein the second scan time is equal to the first scan time.

11. The method of claim 10, wherein the performing of the scanning process comprises:
    performing a Most Recently Used (MRU) full-scan for scanning most recently used channels;
    performing a PRL micro-scan for micro-scanning the channels registered to the PRL; and
    performing a PRL full-scan for full-scanning the channels registered to the PRL.

12. The method of claim 11, wherein each of the first scan time and the second scan time is equal to a sum of times taken for performing the MRU full-scan, the PRL micro-scan, and the PRL full-scan.

13. The method of claim 12, further comprising:
    measuring the first scan time; and
    calculating the power saving time and the second scan time.

14. A mobile terminal, the terminal comprising:
    a first scanner for performing a first scan process including a full-scan on all channels registered to a Preferred Roaming List (PRL);
    a scanning conditioner for calculating, when system information is not acquired by the first scanner, a power saving time on the basis of a first scan time taken for a first scanning process and for setting a second scan time equal to the first scan time; and
    a second scanner for performing a power saving process during the power saving time and a second scanning process during the second scan time alternately until the system information is acquired.

15. The terminal of claim 14, wherein the first scanner performs a Most Recently Used (MRU) full-scan for scanning MRU channels, a PRL micro-scan for micro-scanning the channels registered to the PRL, and a PRL full-scan for full-scanning the channels registered to the PRL.

16. The terminal of claim 15, wherein the first scan time is equal to a sum of times taken for performing the MRU full-scan, the PRL micro-scan, and the PRL full-scan.

17. The terminal of claim 16, wherein the scan conditioner calculates the power saving time by multiplying a compensation value by a second constant, the compensation value being obtained by dividing the first scan time by a first constant.

18. The terminal of claim 17, wherein the second scanner performs the MRU full-scan, PRL micro-scan, and PRL full-scan in series, after the power saving time expires, until the system information is acquired.

19. The terminal of claim 17, wherein the first constant is set to 5, and the second constant is set to 36.

20. A mobile terminal, the terminal comprising:
a scanner for performing one or more iterations of a scanning process including a full-scan on all channels registered to a Preferred Roaming List (PRL); and
a power controller for performing one or more iterations of a power saving process, wherein each iteration of the power saving process is performed after the scanner fails to acquire system information in a preceding iteration of the scanning process,
wherein, when the scanner fails to acquire the system information in an initial iteration of the scanning process, the scanner and the power controller perform an iteration of the scanning process and power saving process alternately until the system information is acquired, and
wherein, when the scanner fails to acquire the system information in the initial iteration of the scanning process, a power saving time and a second scan time to perform subsequent iterations of the scanning process are calculated on the basis of a first scan time to perform the initial iteration of the scanning process, wherein the second scan time is equal to the first scan time.

21. The terminal of claim 20, wherein the scanner, when performing each iteration of the scanning process, performs a Most Recently Used (MRU) full-scan for scanning MRU channels, a PRL micro-scan for micro-scanning the channels registered to the PRL, and a PRL full-scan for full-scanning the channels registered to the PRL, in series.

22. The terminal of claim 21, wherein each of the first scan time and the second scan time is equal to a sum of times taken for performing the MRU full-scan, the PRL micro-scan, and the PRL full-scan.

23. The terminal of claim 22, further comprising a scanning conditioner for measuring the first scan time and for calculating the power saving time and the second scan time.

* * * * *